May 9, 1933. E. F. PAWSAT 1,908,535
BICYCLE BASKET SUPPORT
Filed March 21, 1931
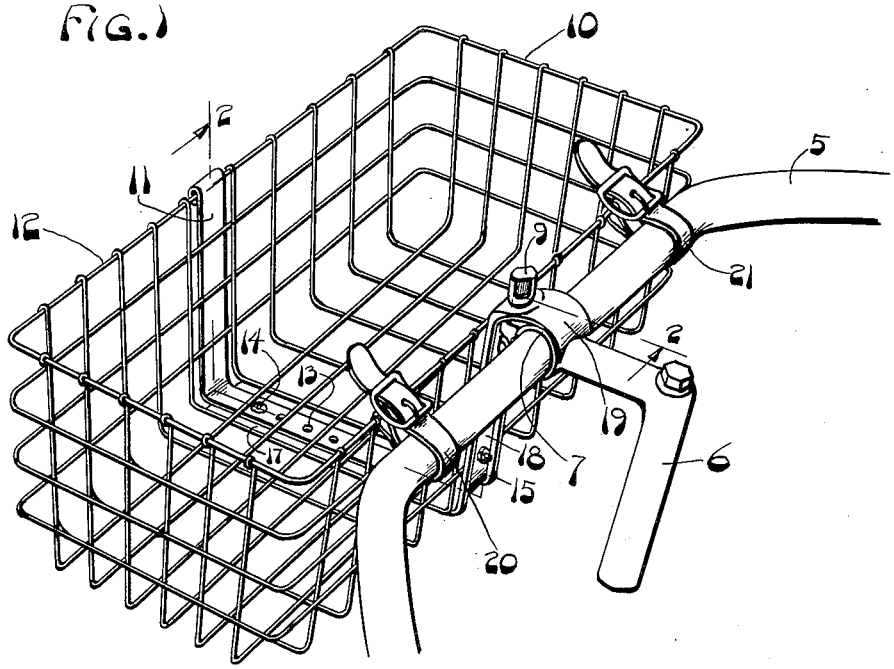
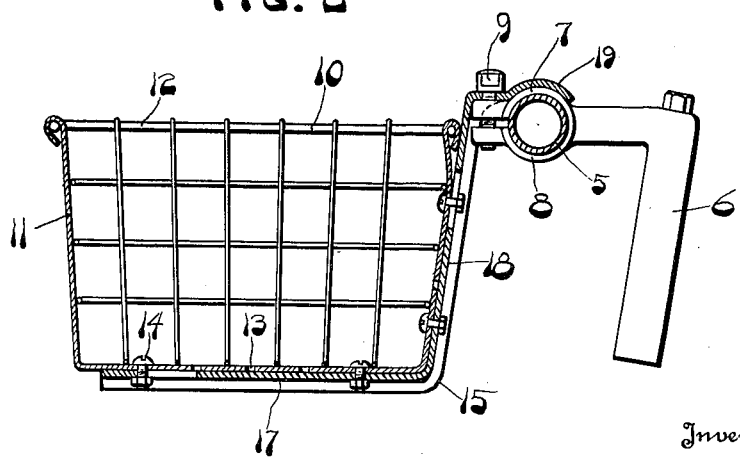
Inventor
Ewald F. Pawsat Patented May 9, 1933

1,908,535

UNITED STATES PATENT OFFICE

EWALD F. PAWSAT, OF MAYSVILLE, KENTUCKY

BICYCLE BASKET SUPPORT

Application filed March 21, 1931. Serial No. 524,351.

This invention relates especially to a means for supporting varying sizes of wire carrying baskets from the bars of bicycles and has for an object to produce a strong, rigid and easily mounted support which utilizes one or more clamping screws with which the usual handle bar post is equipped, as a means of securing the support without alteration of the bicycle equipment.

A still further object attained is to provide adjustment whereby means of slots and bolts through the supporting element and holes to receive the bolts through the strap of the basket a small basket may be substituted for a medium or larger size wire basket without changing the supporting element.

This and other objects are attained in the basket support described in the following specification and illustrated in the accompanying drawing, in which;

Fig. 1 is a perspective view of a basket equipped with a support embodying my invention, and mounted in position on a handle bar post of a bicycle.

Fig. 2 is a transverse sectional view taken on the line 2—2 of Fig. 1.

The usual bicycle handle bar 5 is so mounted in its mounting post 6, that a portion consisting of two jaws 7 and 8, clamps the handle bar against inadvertent movement from adjusted position, a clamping screw 9 being employed for this purpose. Such a clamp and clamping screw affords a most useful means for mounting a carrier basket 10 of usual design and proportions.

To produce the actual mounting for the basket I provide a metal strap 11 which is shaped to conform to the bottom and sides of the basket as a reenforcement for them, the ends of the strap being looped and crimped around the wire rim 12 of the basket to make of it an integral part of the basket structure. This strap is provided with holes 13 at intervals to receive therethrough the bolts 14 by means of which the basket is mounted on the cooperating element 15 which is attached by one of its angles to the handle bar post.

The element 15 of angular design consists of a channel iron or it may be made of suitable flat iron, is bent with one branch 17 horizontal to support the weight of the basket, another branch 18 being substantially vertical to engage the side of the basket and cooperate in supporting it. At the top of branch 18 is an extension 19 which is so shaped as to conform with the shape of clamp jaw 7 and is apertured to receive clamping screw 9 as shown. This extension 19 however may be bent or formed to receive the second screw shown, but not numbered, or formed to fit varying clamp jaws of a bicycle. In the web of element 15 are corresponding slots and holes to match the holes 13 in the strap 11 which receive the bolts 14 by means of which the basket is not only supported but which provides the means for displacing a small basket for a medium or larger basket, the strap 11 of course being clamped by said bolts against the supporting element 15, as shown.

There may be provided, in addition to the channel or flat iron support, two straps 20 and 21, equipped with buckles, which will hold varying sized baskets against movement of a vibratory character when attached to the handle bars as shown.

The supporting element I have described will serve for baskets of various sizes, in as much as the reenforcing strap 11 is provided as a part of each basket and has corresponding holes 13 therein for the bolts 14 to engage the holes and slots of support 15. Also, because of the shape of the extension 19 and its manner of cooperation with bolt 9, complete rigidity of basket mounting is obtained, with accompanying great strength of support 15.

Having thus described my invention, what I claim is:—

A bicycle basket support comprising a metal strap reenforcing the basket about its median line and constituting a unitary part of the basket structure, fastening bolts carrier by the strap, a supporting element of angular shape, having lower and intermediate branches adapted to receive the bottom and side of the strap and having openings therein to selectively receive the bolts, the lower branch of the supporting element receiving the bottom of the strap and lying along the same, the intermediate branch of the supporting element engaging the side of the strap, said supporting element having a top branch, lying substantially horizontal and engaging the handle bar stem clamp and fastened thereto by the stem clamp element which simultaneously clamps the handle bar in position.

In witness whereof, I affix my signature.

EWALD F. PAWSAT.